United States Patent
Karadkar et al.

(10) Patent No.: US 10,851,617 B2
(45) Date of Patent: Dec. 1, 2020

(54) POLYURETHANE FOAMED ANNULAR CHEMICAL PACKER

(71) Applicant: Saudi Arabian Oil Company, Dhahran (SA)

(72) Inventors: Prasad Baburao Karadkar, Dhahran (SA); Mohammed Bataweel, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 75 days.

(21) Appl. No.: 15/792,317

(22) Filed: Oct. 24, 2017

(65) Prior Publication Data

US 2018/0298719 A1    Oct. 18, 2018

Related U.S. Application Data

(60) Provisional application No. 62/484,576, filed on Apr. 12, 2017.

(51) Int. Cl.
| | |
|---|---|
| *E21B 33/138* | (2006.01) |
| *E21B 43/04* | (2006.01) |
| *C09K 8/518* | (2006.01) |
| *C09K 8/44* | (2006.01) |
| *C04B 26/16* | (2006.01) |

(52) U.S. Cl.
CPC .......... *E21B 33/138* (2013.01); *C04B 26/16* (2013.01); *C09K 8/44* (2013.01); *C09K 8/518* (2013.01); *E21B 43/045* (2013.01)

(58) Field of Classification Search
CPC ..... E21B 33/138; E21B 43/045; C04B 26/16; C09K 8/44; C09K 8/518
See application file for complete search history.

(56) References Cited

U.S. PATENT DOCUMENTS

| | | |
|---|---|---|
| 3,878,686 A | 4/1975 | Hageman et al. |
| 5,250,580 A | 10/1993 | Parsonage et al. |
| 7,926,565 B2 | 4/2011 | Duan et al. |

(Continued)

OTHER PUBLICATIONS

International Search Report and Written Opinion for International Application No. PCT/US2018/027238; International Filing Date Apr. 12, 2018; Report dated Jul. 2, 2018 (pp. 1-13).

(Continued)

*Primary Examiner* — Crystal J Miller
(74) *Attorney, Agent, or Firm* — Bracewell LLP; Constance G. Rhebergen; Brian H. Tompkins

(57) ABSTRACT

A chemical packer composition having a polyurethane foam with nanoparticles or micron-sized particles for use as an annular chemical packer in openhole horizontal wells is provided. The chemical packer composition may be used in a horizontal well having a screen (for example, a gravel pack screen) and completed using an openhole completion. The chemical packer composition may include, for example, silica nanoparticles or sand micron-sized particles. The chemical packer composition may be placed in an annulus section defined by the wellbore and the screen that traverses one or more fluid producing zones. In some instances, a portion of the chemical packer composition may be selectively removed to open a fluid producing zone to the wellbore and form plugs blocking other fluid producing zones.

8 Claims, 8 Drawing Sheets

(56) References Cited

U.S. PATENT DOCUMENTS

| | | | |
|---|---|---|---|
| 8,714,241 B2 | 5/2014 | Joseph et al. | |
| 2004/0035579 A1* | 2/2004 | Parlar | E21B 43/04 166/278 |
| 2004/0060698 A1* | 4/2004 | Ravensbergen | E21B 37/06 166/278 |
| 2006/0048938 A1* | 3/2006 | Kalman | C09K 8/80 166/278 |
| 2008/0194717 A1* | 8/2008 | Vaidya | C08C 19/00 521/142 |
| 2009/0084539 A1 | 4/2009 | Duan et al. | |
| 2010/0058697 A1 | 3/2010 | Wagner | |
| 2011/0067872 A1* | 3/2011 | Agrawal | E21B 43/082 166/302 |
| 2011/0073296 A1* | 3/2011 | Richard | E21B 43/082 166/56 |
| 2011/0162840 A1 | 7/2011 | Haeberle et al. | |
| 2013/0062049 A1 | 3/2013 | Ren et al. | |
| 2013/0062061 A1* | 3/2013 | Taylor | E03B 3/18 166/288 |
| 2013/0087338 A1 | 4/2013 | Watkins et al. | |
| 2013/0098622 A1 | 4/2013 | Abad et al. | |
| 2013/0175026 A1 | 7/2013 | Chakraborty et al. | |
| 2014/0000869 A1* | 1/2014 | Holderman | E21B 33/127 166/187 |
| 2014/0262257 A1 | 9/2014 | Fustos et al. | |
| 2016/0145486 A1* | 5/2016 | Weaver | C09K 8/38 507/219 |
| 2017/0114211 A1 | 4/2017 | Kumar et al. | |
| 2017/0267585 A1 | 9/2017 | Kumar et al. | |
| 2018/0022984 A1* | 1/2018 | Salla | C09K 8/03 166/300 |

OTHER PUBLICATIONS

Mansure, A.J. et al.; "Polyurethane Grouting Geothermal Lost Circulation Zones" IADC/SPE 74556, IADC/SPE Drilling Conference, Dallas, TX Feb. 26-28, 2002; pp. 1-11.

* cited by examiner

POLYURETHANE FOAMED ANNULAR CHEMICAL PACKER

CROSS-REFERENCE TO RELATED APPLICATIONS

This application claims priority from U.S. Provisional Application No. 62/484,576 filed Apr. 12, 2017, and titled "POLYURETHANE FOAMED ANNULAR CHEMICAL PACKER." For purposes of United States patent practice, this application incorporates the contents of the Provisional Application by reference in its entirety.

BACKGROUND

Field of the Disclosure

The present disclosure generally relates to completion of oil and gas wells. More specifically, embodiments of the disclosure relate to packers for use in completion operations.

Description of the Related Art

In the recovery of hydrocarbons from subterranean formations, wellbores may be drilled with multiple highly deviated or horizontal segments that extend through separate zones. For example, a horizontal well may extend through multiple hydrocarbon producing zones and water producing zones. The completion of such wells may involve different techniques and devices to shut-off production of water from the water producing zones and optimize production of hydrocarbons from the hydrocarbon producing zones. For example, mechanical packers may be used to isolate an annulus in a well from production casing and tubing. However, the placement of packers in a well may be challenging, in addition to the challenges of the use and placement of such packers with other completion devices and horizontal or deviated wells.

SUMMARY

Some wells may be completed using an openhole completion, such that the well does not have a casing or liner in some portions of the well and produced hydrocarbons flow directly into the wellbore. A "horizontal openhole" well refers to a horizontal well with an openhole completion. Such horizontal openhole wells may be completed using a screen, such as a gravel pack screen. A gravel pack screen is a metal assembly inserted into a wellbore and having components that retain "gravel" or sand placed in openhole portions of the well around the annulus of the screen. Fluids from a surrounding formation may flow through the gravel and screen and into the wellbore.

In some instances, a gravel pack screen may extend across multiple zones, such as across a hydrocarbon-producing zone and a water producing zone. In these instances, the selective placement of a packer to shut-off water production from the water producing zone in proximity to the screen may be challenging.

In one embodiment, a method for producing hydrocarbons in a subterranean well is provided. The method includes installing a screen in a horizontal wellbore, the screen defining an annulus between an inner surface of the wellbore and the screen and the annulus having a section that traverses a fluid producing zone in the formation. The method also includes placing a chemical packer composition in the annulus section between the inner surface of the wellbore and the screen that traverses the fluid producing zone. The chemical packer composition includes a polyurethane foam and a plurality of particles, such that the chemical packer composition forms a plug in the annulus section. In some embodiments, the plurality of particles include a plurality of silica particles, each of the plurality of silica particles having a diameter in the range of 1 nanometer (nm) to 150 nm. In some embodiments, the plurality of particles include a plurality of sand particles, each of the plurality of sand particles having a diameter in the range of 1 micron ($\mu$m) to about 1000 $\mu$m. In some embodiments, the fluid producing zone is a water producing zone. In some embodiments, the fluid producing zone is a hydrocarbon producing zone. In some embodiments, the method includes removing the plug by introducing a dissolver into the wellbore to contact the plug. In some embodiments, the dissolver includes an acid, an organic solvent, a chelating agent, or an oxidizing agent. In some embodiments, placing the chemical packer composition in the annulus section between the inner surface of the wellbore and the screen that traverses the fluid producing zone includes inserting an inflatable straddle packing into the wellbore at a well depth sufficient to isolate a section of the wellbore traversing the water producing zone, inserting coiled tubing into the wellbore, and pumping the chemical packer composition into the annulus section via the coiled tubing. In some embodiments, the screen is a gravel pack screen. In some embodiments, the method includes blending the polyurethane foam and the plurality of particles at the surface to form the chemical packer composition before placing the chemical packer composition in the annulus section between the inner surface of the wellbore and the screen that traverses the fluid producing zone.

In another embodiment, a method for producing hydrocarbons in a subterranean well is provided. The method includes installing a screen in a horizontal wellbore, the screen defining an annulus between an inner surface of the wellbore and the screen and the annulus having a section that traverses a first fluid producing zone, a second fluid producing zone, and a third fluid producing zone in the formation. The second fluid producing zone is located between the first fluid producing zone and the third fluid producing zone. The method also includes placing a chemical packer composition in the annulus section between the inner surface of the wellbore and the screen that traverses the first fluid producing zone, the second fluid producing zone, and the third fluid producing zone. The chemical packer composition includes a polyurethane foam and a plurality of particles. The method further includes selectively removing a portion of the chemical packer composition that traverses the second fluid producing zone, such that the chemical packer composition forms a first annular plug blocking fluid flow between the first fluid producing zone and the wellbore and a second annular plug blocking fluid flow between the third fluid producing zone and the wellbore. In some embodiments, the plurality of particles include a plurality of silica particles, each of the plurality of silica particles having a diameter in the range of 1 nanometer (nm) to 150 nm. In some embodiments, the plurality of particles include a plurality of sand particles, each of the plurality of sand particles having a diameter in the range of 1 micron ($\mu$m) to about 1000 $\mu$m. In some embodiments, the method includes selectively removing a portion of the chemical packer composition by introducing a dissolver into the wellbore to contact the portion of the chemical packer composition. In some embodiments, the dissolver includes an acid, an organic solvent, a chelating agent, or an oxidizing agent. In some embodiments, placing the chemical packer composition in the annulus section between the inner surface of the wellbore and the screen that traverses the first fluid producing zone, the second fluid producing zone, and the third fluid producing zone includes inserting an inflatable straddle packing into the wellbore at a well depth sufficient to isolate a section of the wellbore traversing the water producing zone, inserting coiled tubing into the wellbore, and pumping the chemical packer composition into the annulus section between the inner surface of the wellbore and the screen via the coiled tubing. In some embodiments, the screen includes a gravel pack screen. In some embodiments, the method includes blending the polyurethane foam and the plurality of particles at the surface to form the chemical packer composition before placing the chemical packer composition in the annulus section between the inner surface of the wellbore and the screen that traverses a first fluid producing zone, a second fluid producing zone, and a third fluid producing zone. In some embodiments, the first fluid producing zone is a first water producing zone, the second fluid producing zone is a hydrocarbon producing zone, and the third fluid producing zone is a second water producing zone, such that the first annular plug blocks fluid flow between the first water producing zone and the wellbore and the second annular plug blocks fluid flow between the second water producing zone and the wellbore. In some embodiments, the first fluid producing zone is a first hydrocarbon producing zone, the second fluid producing zone is a water producing zone, and the third fluid producing zone is a second hydrocarbon producing zone, such that the first annular plug is formed between the first hydrocarbon producing zone and the wellbore and the second annular plug is formed between the second hydrocarbon producing zone and the wellbore. In some embodiments, the method further includes introducing a water shut-off treatment into the water producing zone, such that the first annular plug blocks introduction of the water shut-off treatment into the first hydrocarbon producing zone and the second annular plug blocks introduction of the water shut-off treatment into the second hydrocarbon producing zone.

In another embodiment, a chemical packer composition is provided. The chemical packer composition includes a polyurethane foam and a plurality of particles. In some embodiments, the plurality of particles include a plurality of silica particles, each of the plurality of silica particles having a diameter in the range of 1 nanometer (nm) to 150 nm. In some embodiments, the plurality of particles include a plurality of sand particles, each of the plurality of sand particles having a diameter in the range of 1 micron ($\mu$m) to about 1000 $\mu$m. In some embodiments, the chemical packer composition is dissolvable upon contact with a dissolver.

DETAILED DESCRIPTION

Figure 1A:
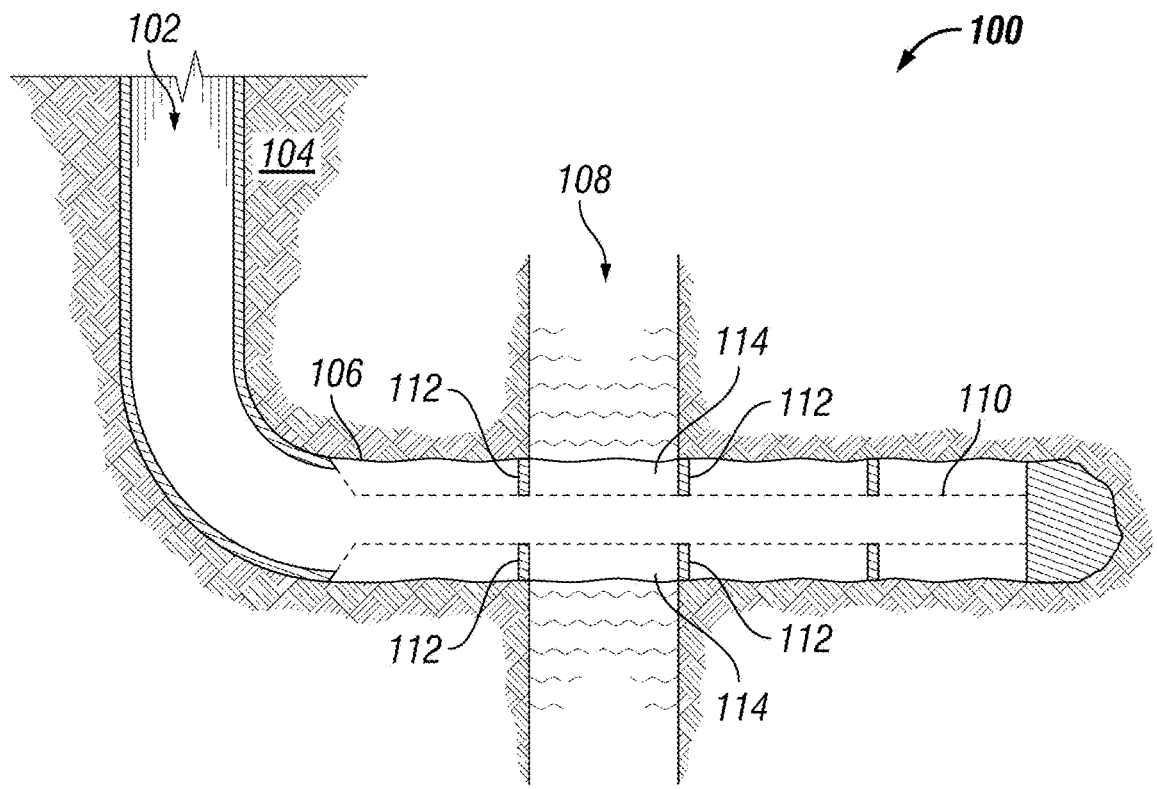
FIGS. 1A and 1B are schematic diagrams of a well that depict installation of a polyurethane foam-particles chemical packer in accordance with an embodiment of the disclosure.

The present disclosure will now be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

Embodiments of the disclosure include a chemical packer composition consisting of polyurethane foam. Embodiments of the disclosure further include a chemical packer composition having a polyurethane foam with nanoparticles or micron-sized particles for use as an annular chemical packer in openhole horizontal wells completed with gravel pack screens. The chemical packer composition may be formed by blending the polyurethane foam with nanoparticles or micron-sized particles before using the chemical packer composition downhole.

As discussed in the disclosure, the chemical packer composition may be used in a horizontal well having a screen (for example, a gravel pack screen) and completed using an openhole completion. The chemical packer composition may be selectively placed in an annulus section defined by the wellbore and the screen and that traverses one or more fluid producing zones. For example, in some embodiments, the chemical packer composition may be placed in an annulus section that traverses a water producing zone to form a plug between the water producing zone and the wellbore such that the plug may block water from the water producing zone from entering the wellbore.

In some embodiments, the chemical packer composition may be placed in an annulus section that traverses a first water producing zone, a second water producing zone, and a hydrocarbon producing zone disposed between the water producing zones. A portion of the chemical packer composition that traverses the hydrocarbon producing zone may be removed to form a first annular plug between the first water producing zone and the wellbore and a second annular plug between the second water producing zone and the wellbore. The annular plugs may block water from the water producing zones from entering the wellbore while allowing hydrocarbons from the hydrocarbon producing zone to enter the wellbore.

In some embodiments, the chemical packer composition may be placed in an annulus section that traverses a first hydrocarbon producing zone, a second hydrocarbon producing zone, and a water producing zone disposed between the hydrocarbon producing zones. A portion of the chemical packer composition that traverses the water producing zone may be removed to form a first annular plug between the first hydrocarbon producing zone and the wellbore and a second annular plug between the second hydrocarbon producing zone and the wellbore. A water shut-off treatment may be introduced into the wellbore and into the water producing zone, such that the annular plugs block the water shut-off treatment from entering the hydrocarbon producing zones.

In some embodiments, the chemical packer composition includes a polyurethane foam and a plurality of colloidal silica particles having diameters in the range of 4 nanometers (nm) to 150 nm. In some embodiments, the chemical packer composition includes a polyurethane foam and a plurality of sand particles having diameters in the range of 1 micron (μm) to about 1000 microns. An example polyurethane foam for use as an annular chemical packer may have the following properties:

TABLE 1

Properties of Example Polyurethane Foam

| | |
|---|---|
| Density (kilograms (kg))/meters$^3$ (m$^3$)) | 641 |
| Tensile Strength (kiloPascals (kPa)) - Parallel to Rise | 19092 |
| Tensile Strength (kPa) - Perpendicular to Rise | 19837 |
| Coefficient of Thermal Expansion (meter per meter-degrees Kelvin (m/m-K)) (from −50° F. to 200° F., GP method) | $61 \times 10^{-6}$ |
| Compressive Strength (kiloPascals (kPa)) @ 200° F. (Parallel to Rise) | 13797 |
| Compressive Strength (kPa) @ 250° F. (Parallel to Rise) | 11377 |
| Compressive Strength (kPa) @ 75° F. (Perpendicular to Rise) | 31131 |
| Compressive Strength (kPa) @ 200° F. (Perpendicular to Rise) | 18465 |
| Compressive Strength (kPa) @ 250° F. (Perpendicular to Rise) | 11722 |

It should be appreciated that the polyurethane foam properties listed in Table 1 are merely one example and embodiments of the disclosure may include other polyurethane foams suitable for use in the composition discussed in the disclosure. In some embodiments, the polyurethane foam may be LAST-A-FOAM® FR-3740 manufactured by General Plastics Manufacturing Company of Tacoma, Wash., USA.

In some embodiments, the nanoparticles in the chemical packer composition may be colloidal silica. In such embodiments, the colloidal silica may include particles having diameters in the range of about 4 nm to about 150 nm. An example colloidal silica may include sodium stabilized silica particles dispersed in water. In some embodiments, the colloidal silica may be Levasil® colloidal silica obtained from AkzoNobel of Amsterdam, the Netherlands.

In some embodiments, the micron-sized particles in the chemical packer composition may be sand particles. In such embodiments, the sand particles may include particles having diameters in the range of about 1 micron to about 1000 microns.

Figure 1B:
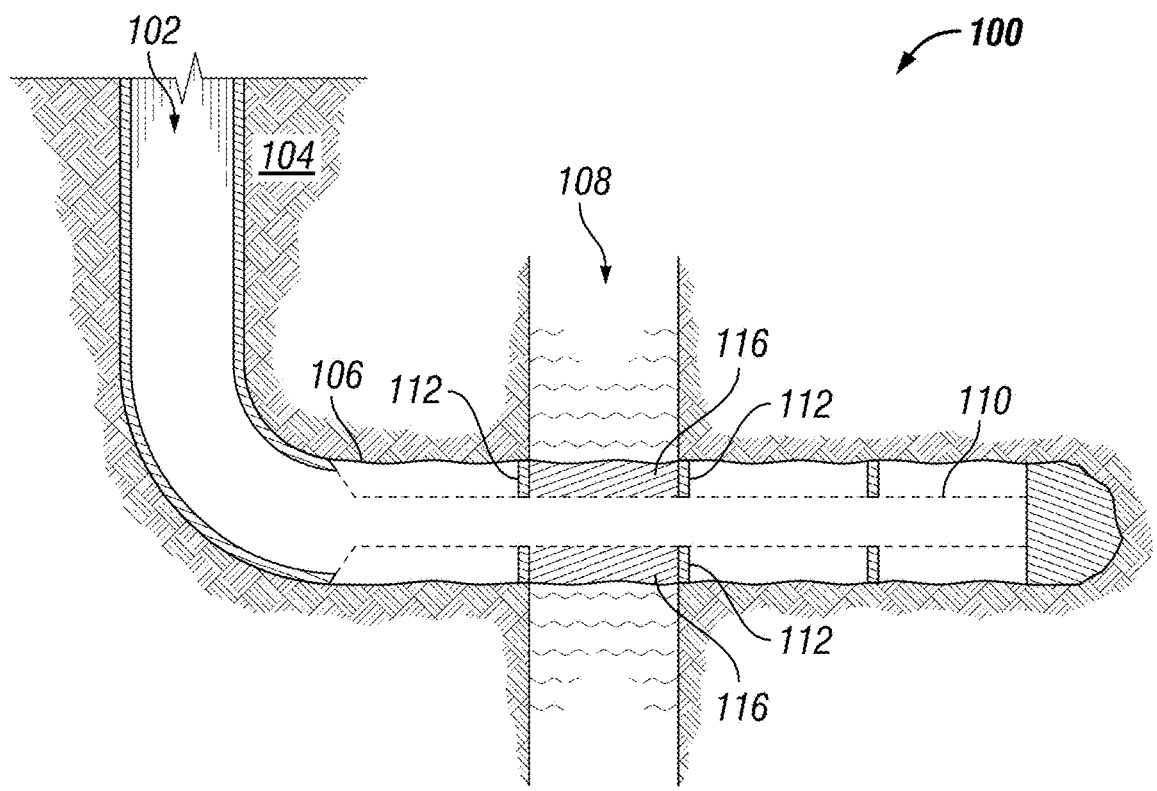
Figure 2:
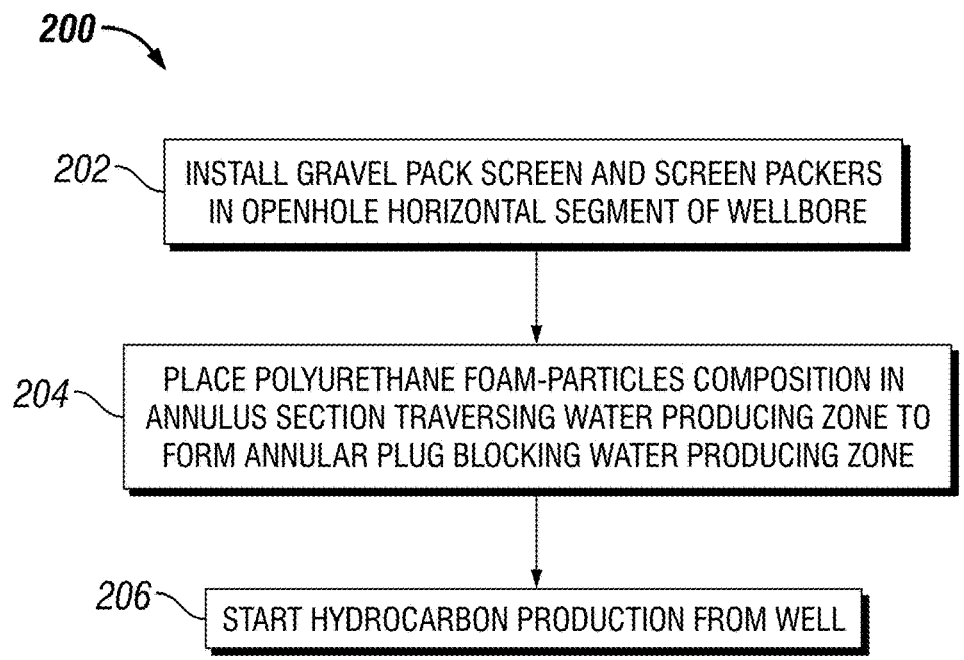
FIG. 2 is a block diagram of a process for installing a polyurethane foam-particles chemical packer as shown in FIGS. 1A and 1B in accordance with an embodiment of the disclosure.

With the foregoing in mind, FIGS. 1-6 and the corresponding paragraphs describe various embodiments of processes for blocking fluid production in a well using the disclosed chemical packer composition. FIGS. 1A, 1B, and 2 describe placement of a polyurethane foam-particles chemical packer composition in a screen-openhole annulus section to block water production from a water production zone. FIGS. 1A and 1B depicts a well 100 having a wellbore 102 extending in a subterranean formation 104 in accordance with embodiments of the disclosure. The wellbore 102 includes a horizontal openhole portion 106 traversing a water producing zone 108 in the formation 104. As will be appreciated, water from the water producing zone 108 may enter the wellbore 102 and reduce the efficiency of hydrocarbon production from the well 100. For example, the water producing zone 108 may include or be in fluid connection with an aquifer or other underground sources of water.

As shown in FIGS. 1A and 1B, the well 100 includes a gravel pack screen 110 installed in the openhole horizontal segment 106 to complete the well 100 and facilitate hydrocarbon production. As also shown in FIGS. 1A and 1B, screen packers 112 may be installed at the appropriate well depths to isolate an annulus section 114 defined by the gravel pack screen 110 that traverses the water producing zone 108.

A polyurethane foam-particles chemical packer composition may be installed to prevent water production from the water producing zone 108 and improve the efficiency of production of hydrocarbons from well 100. A chemical packer composition of polyurethane foam and silica nanoparticles or sand micron-sized particles may be blended at the surface and placed in the annulus section 114 of the gravel pack screen 112 that traverses the water producing zone 108. For example, an inflatable straddle packer may be installed at the appropriate well depths to isolate the section of the wellbore 102 corresponding to the annulus section 114. The polyurethane foam-particles chemical packer composition may be pumped downhole through the screen 110 and into the annulus section 114. In some embodiments, the polyurethane foam-particles chemical packer composition may be cured for a time period. In some embodiments, polyurethane foam-particles chemical packer composition may be cured for a period of about 1 hour to about 24 hours.

As shown in FIG. 1B, the polyurethane foam-particles chemical packer composition forms a plug 116 in the annulus section 114 of the gravel pack screen 110 between the water producing zone 108 and the wellbore 102. The plug 116 may block water from the water producing zone 108 from entering the wellbore 102, thus improving the efficiency of hydrocarbon production from the well 100.

FIG. 2 depicts a process 200 for placing a polyurethane foam-particles chemical packer composition as depicted in FIGS. 1A and 1B and in accordance with embodiments of the disclosure. Initially, a gravel pack screen and screen packers may be installed in an openhole horizontal segment of a wellbore having a water producing zone (block 202). As shown in FIGS. 1A, and 1B, the screen packers may isolate an annulus section defined by the screen that traverses the water producing zone.

A polyurethane foam-particles chemical packer composition may be blended at the surface and placed in an annulus section that traverses the water producing zone to form a polyurethane foam-particle plug that blocks water production from the water producing zone (block 204). For example, in some embodiments, straddle packers may be placed on either side of the water producing zone and the polyurethane foam-particles composition may be pumped into the annulus using coil tubing inserted into the wellbore.

In some embodiments, the polyurethane foam-particles chemical packer composition may be allowed to cure for a time period to form the plug. In some embodiments, as discussed supra, the polyurethane foam-particles chemical packer composition may be a polyurethane foam and silica nanoparticles (for example, as colloidal silica). In such embodiments, the polyurethane foam and colloidal silica may be blended the surface and then pumped downhole as described in the process 200. After formation of the polyurethane foam-particle plug, hydrocarbon production from the well may be started (block 206), such that water production from the water producing zone into the produced hydrocarbons is prevented by the plug.

Figure 3A:
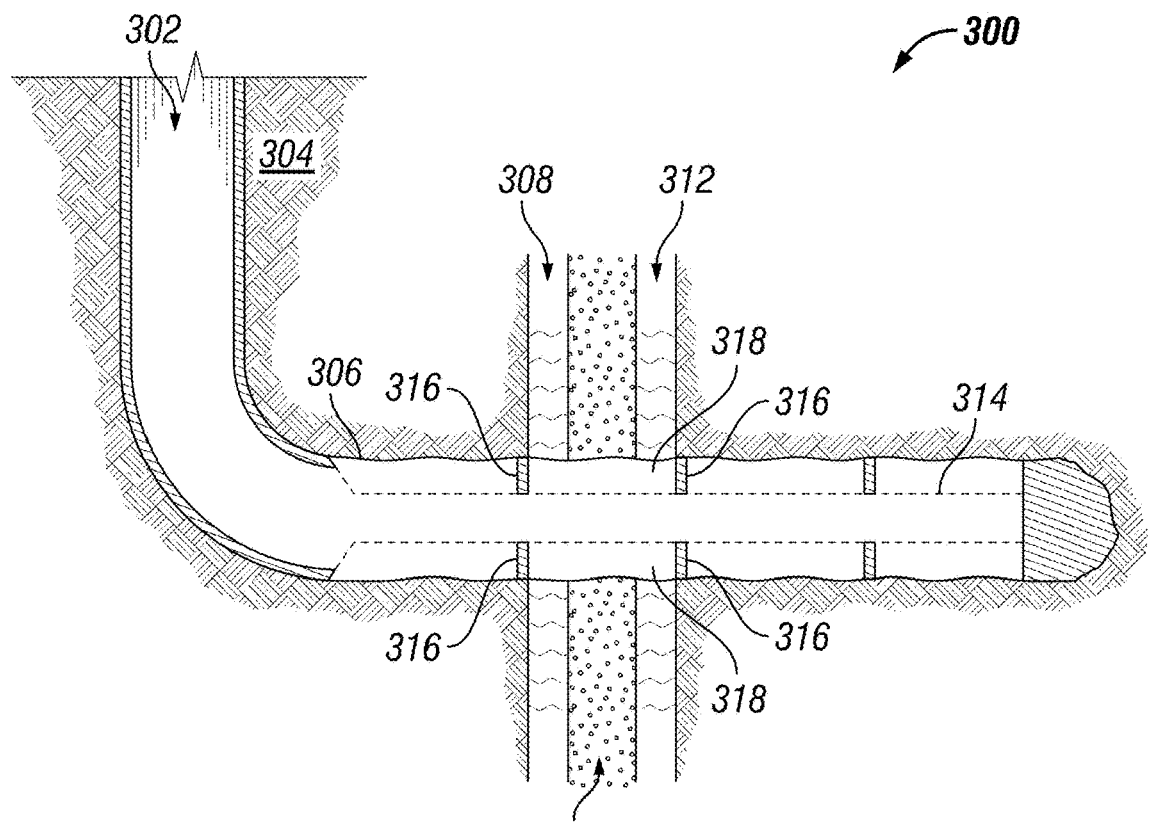
FIGS. 3A-3C are schematic diagrams of a well that depict installation of a polyurethane foam-particles chemical packer in accordance with another embodiment of the disclosure.
Figure 3B:
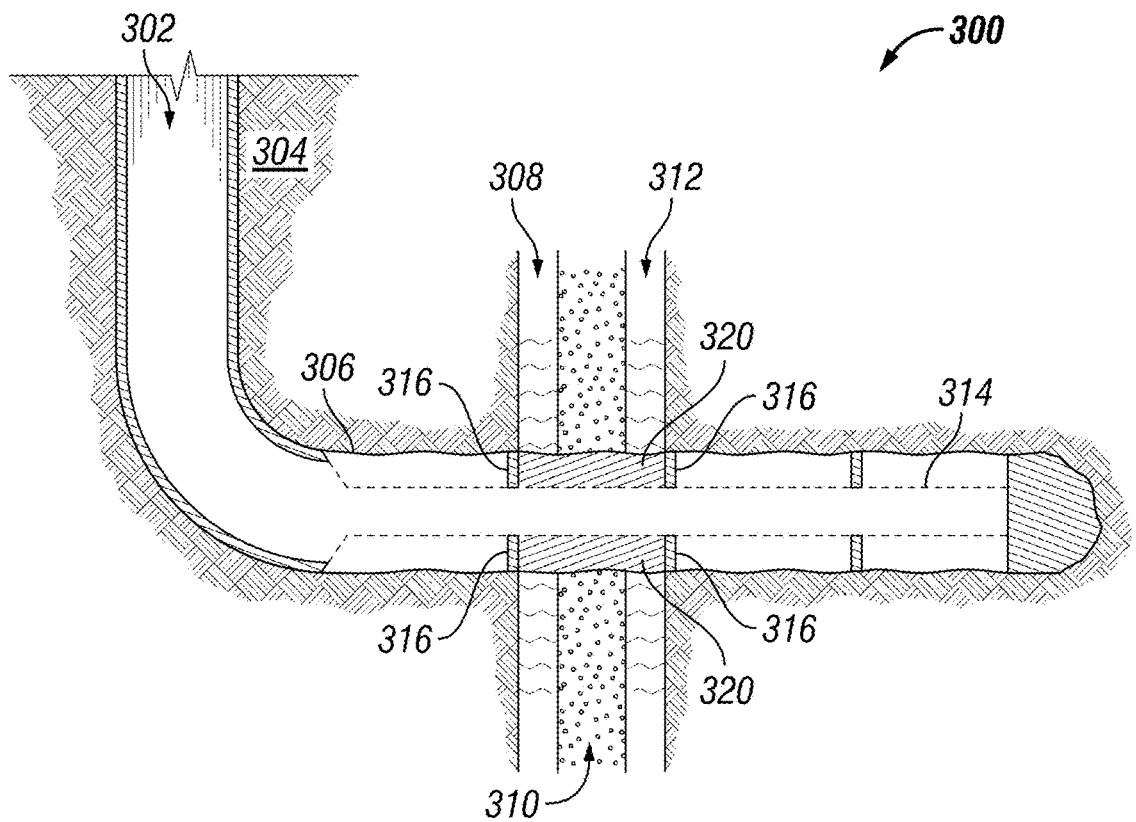
Figure 3C:
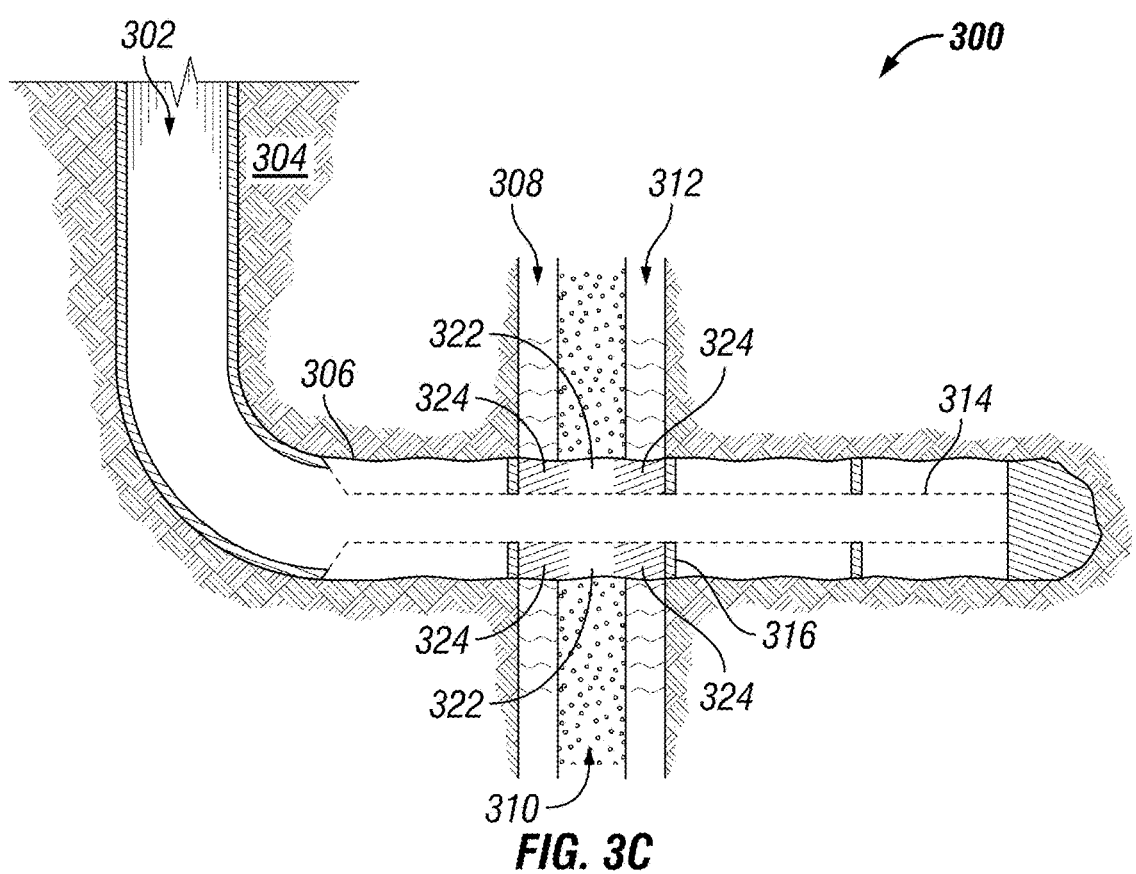

FIGS. 3A-3C depict placement of a polyurethane foam-particles chemical packer composition in a screen-openhole annulus section and selective removal of a portion of the polyurethane foam-particles chemical packer composition in accordance with embodiments of the disclosure.

FIG. 3A-3C depicts a well 300 having a wellbore 302 extending in a subterranean formation 304 in accordance with embodiments of the disclosure. The wellbore 302 includes a horizontal openhole portion 306 traversing a first water producing zone 308, a hydrocarbon producing zone 310, and a second water producing zone 312 in the formation 304. As shown in FIGS. 3A-3C, the hydrocarbon producing zone 310 is located between the water producing zones 308 and 312. As will be appreciated, water from the water producing zones 308 and 312 may enter the wellbore 302 and reduce the efficiency of hydrocarbon production from the well 300. For example, the water producing zones 308 and 312 may include or be in fluid connection with an aquifer or other underground sources of water.

As shown in FIG. 3A, the well portion 300 includes a gravel pack screen 314 installed in the openhole horizontal segment 306. The screen 314 may include screen packers 316 installed at the appropriate well depths to isolate an annulus section 318 defined by the gravel pack screen 314 and that traverses the first water producing zone 308, the hydrocarbon producing zone 310, and the second water producing zone 312. As described infra, a polyurethane foam-particles chemical packer may be installed and selectively removed to prevent water production from the water producing zones 308 and 312 and improve the efficiency of production of hydrocarbons from the hydrocarbon producing zone 310.

As shown in FIG. 3B, a polyurethane foam-particles chemical packer composition 320 may be placed in the annulus section 318 that traverses the first water producing zone 308, the hydrocarbon producing zone 310, and the second water producing zone 312. For example, an inflatable straddle packer may be installed at the appropriate well depths to isolate the segment of the wellbore 302 corresponding to the annulus section 318. The polyurethane foam-particles composition may be pumped downhole through the screen 314 and into the annulus section 318. In some embodiments, the polyurethane foam-particle composition may be cured for a time period.

As shown in FIG. 3C, a portion of the polyurethane foam-particles composition 320 traversing the hydrocarbon producing zone 310 may be selectively removed to create a annular space 322 (that is, an unplugged space) in the annulus section 318 open to the hydrocarbon producing zone 310 while forming annular plugs 324 in the annulus section 318 between the water producing zones 308 and 312 and the wellbore 302. The portion of the polyurethane foam-particle composition 320 may be removed using a chemical capable of degrading polyurethane foam (referred to herein as a "dissolver"). For example, in some embodiments the portion of the polyurethane foam-particles composition 320 may be removed using hydrochloric acid. In other embodiments, the portion of the polyurethane foam-particles composition 320 may be removed using other suitable acids or solvents, such as sulfuric acid, organic based solvents, chelating agents, or oxidizing agent. In some embodiments, after placement of the chemical packer composition 320, an inflatable straddle packer may be installed in the wellbore 302 at the appropriate depths to isolate the section of the wellbore having the portion of the polyurethane foam-particles composition to be removed. After installation of the inflatable straddle packer, the chemical used to remove the portion of the polyurethane foam-particles composition may be injected into the annulus section 318. The annular space 322 formed by removal of the portion polyurethane foam-particles composition may enable the production of hydrocarbons from the hydrocarbon producing zone 310 into the wellbore 302 while the annular plugs 324 prevent water production from the first water producing zone 308 and the second water producing zone 312.

Figure 4:
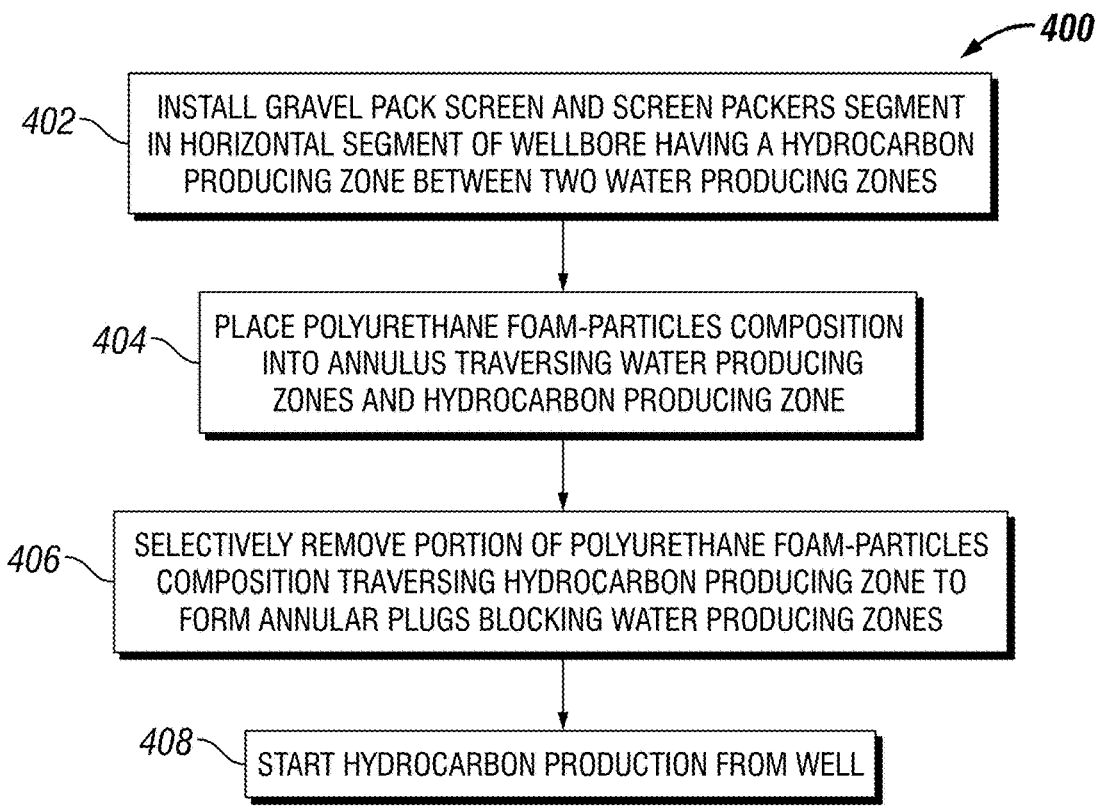
FIG. 4 is a block diagram of a process for installing a polyurethane foam-particles chemical packer as shown in FIGS. 3A-3C in accordance with an embodiment of the disclosure.

FIG. 4 depicts a process 400 for selectively placing a polyurethane foam-particles plug as depicted in FIGS. 3A-3C and in accordance with embodiments of the disclosure. Initially, a gravel pack screen and screen packers may be installed in an openhole horizontal segment of a wellbore having a hydrocarbon producing zone located between two water producing zones (block 402). A polyurethane foam-particles chemical packer composition may be placed in an annulus section that traverses the water producing zones and hydrocarbon producing zone (block 404). For example, in some embodiments, straddle packers may be placed on either side of the water producing zones and the polyurethane foam-particles composition may be pumped into the annulus section using coil tubing inserted into the wellbore. In some embodiments, the polyurethane foam-particles chemical packer composition may be cured for a time period after placement in the annulus section.

Next, a portion of the polyurethane foam-particles composition traversing the hydrocarbon producing zone may be selectively removed such that annular plugs blocking the water producing zones are formed (block 406). For example, as discussed supra, the portion of the polyurethane foam-particle composition may be removed using hydrochloric acid or another chemical capable of degrading polyurethane foam (referred to herein as a "dissolver"). In such embodiments, an inflatable straddle packer may be installed in a wellbore at the appropriate depths to isolate the section of the wellbore having the portion of the polyurethane foam-particles composition to be removed. After installation of the inflatable straddle packer, the chemical used to remove the portion of the polyurethane foam-particles composition may be injected into the annulus section.

After removal of a portion of the polyurethane foam-particles composition and formation of the plugs blocking the water producing zones, hydrocarbon production from the well may be started (block 408), such that water production from the water producing zones into the produced hydrocarbons is prevented by the annular plugs.

Figure 5A:
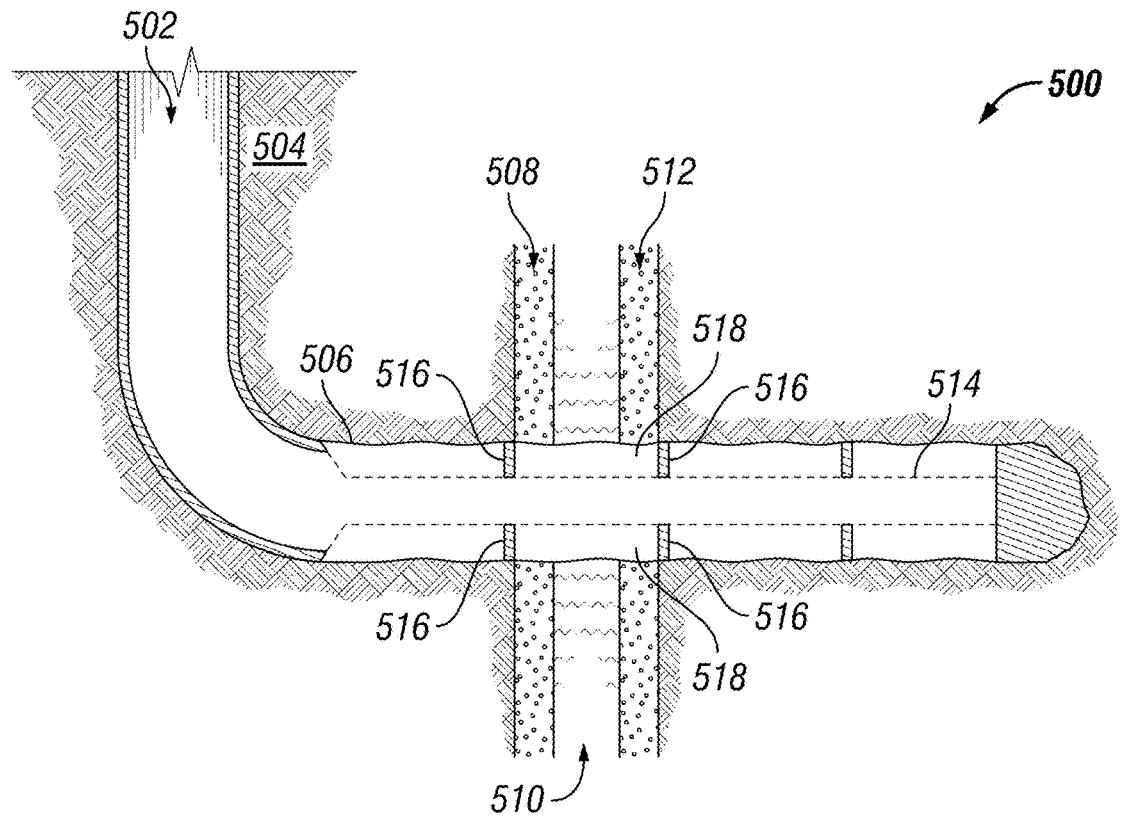
FIGS. 5A-5C are schematic diagrams of a well that depict installation of a polyurethane foam-particles chemical packer in accordance with another embodiment of the disclosure.
Figure 5B:
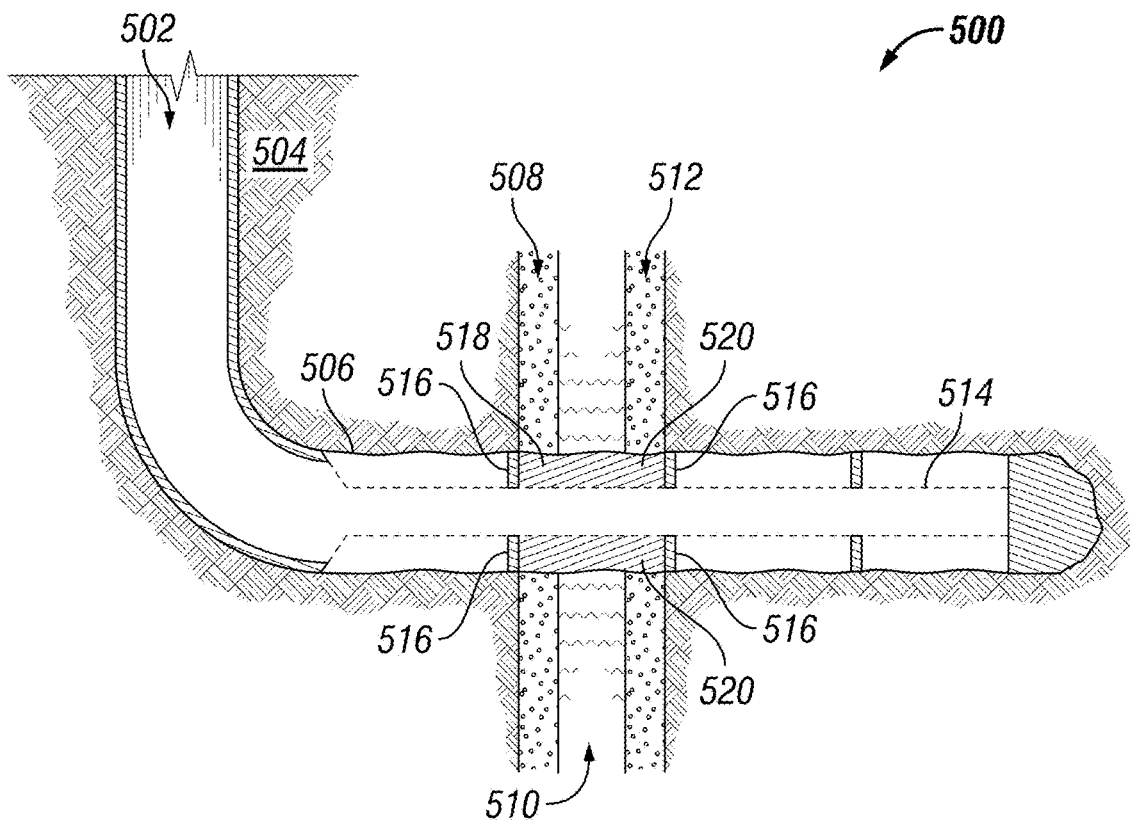
Figure 5C:
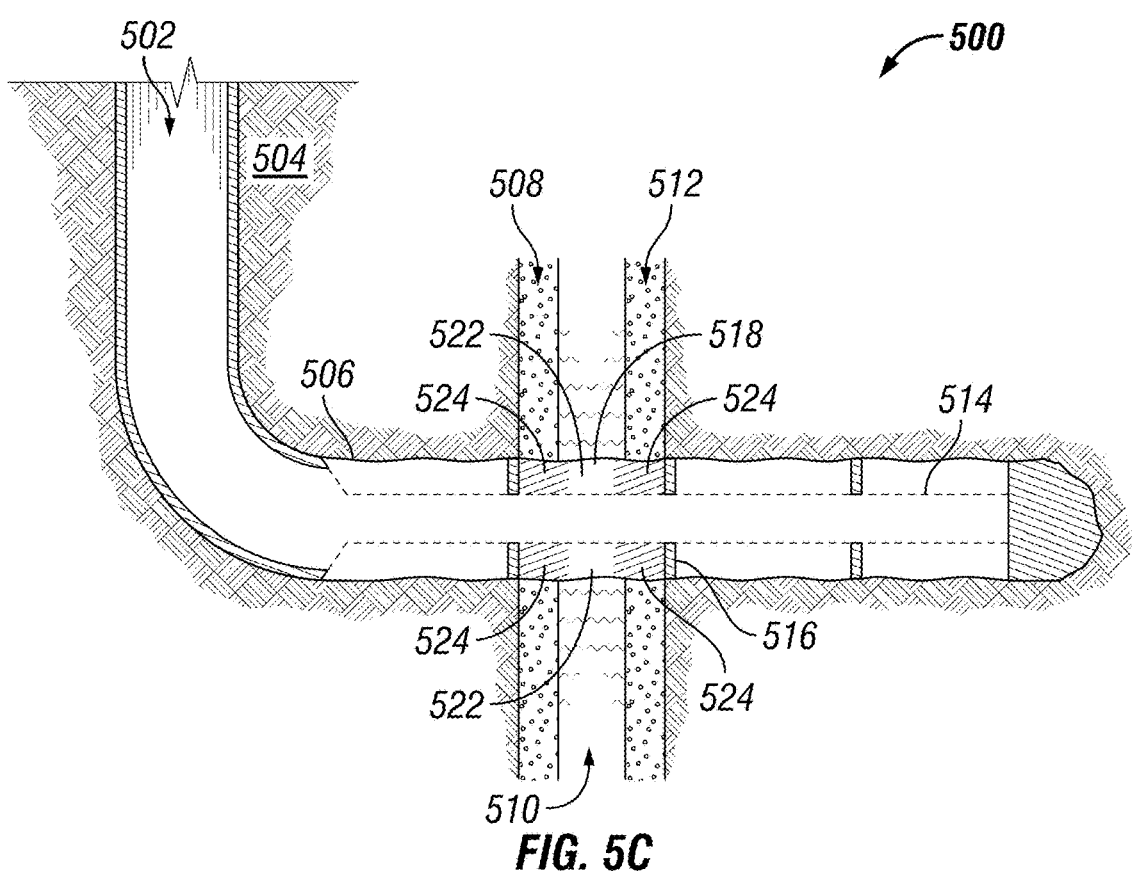

FIGS. 5A-5C depict selective placement of a polyurethane foam-particles packer between screen compartments and in a screen-openhole annulus, and further illustrate selective removal of the polyurethane foam-particles chemical packer composition to facilitate introduction of a water shut-off treatment in accordance with additional embodiments of the disclosure.

FIG. 5A-5C depicts a portion 500 of a well having a wellbore 502 extending in a subterranean formation 504 in accordance with embodiments of the disclosure. The wellbore 502 includes a horizontal openhole portion 506 traversing a first hydrocarbon producing zone 508, a water producing zone 510, and a second hydrocarbon producing zone 512 in the formation 504. As shown in FIGS. 5A-5C, the water producing zone 510 is located between the water producing zones 508 and 512. As will be appreciated, water from the water producing zone 510 may enter the wellbore 502 and reduce the efficiency of hydrocarbon production from the well 500. For example, the water producing zone 510 may include or be in fluid connection with an aquifer or other underground sources of water. In some embodiments, as discussed infra, a water shut-off treatment may be introduced into the water producing zone 510 to reduce or prevent production of water from the zone 510. Such water shut-off treatments may include, by way of example, polymer gels.

As shown in FIG. 5A, the well 500 includes a gravel pack screen 514 installed in the openhole horizontal segment 506. The screen 514 may include screen packers 516 installed at the appropriate well depths to isolate an annulus section 518 of the gravel pack screen 514 that traverses the first hydrocarbon producing zone 508, the water producing zone 510, and the second hydrocarbon producing zone 512. As described infra, a polyurethane foam-particles chemical packer may be installed and selectively removed to enable introduction of a water shut-off treatment into the water producing zone 510 but block the water shut-off treatment from entering the hydrocarbon producing zones 508 and 512, such that the hydrocarbon producing zones 508 and 512 are undamaged by the water shut-off treatments.

As shown in FIG. 5B, a polyurethane foam-particles composition may be placed in the annulus section 518 that traverses the first hydrocarbon producing zone 508, the water producing zone 510, and the second hydrocarbon producing zone 512. For example, an inflatable straddle packer may be installed at the appropriate well depths to isolate the segment of the wellbore 502 corresponding to the annulus section 518. The polyurethane foam-particles composition may be pumped downhole through the screen 514 and into the annulus section 518. In some embodiments, the polyurethane foam-particle composition may be cured for a time period.

As depicted in FIGS. 5B and 5C, a portion of the polyurethane foam-particles composition 520 traversing the water producing zone 510 may be selectively removed to create a annular space 522 (that is, an unplugged space) in the annulus section 518 open to the water producing zone 510 while forming annular plugs 524 in the annulus section 518 between the hydrocarbon producing zones 508 and 510 and the wellbore 502. The portion of the polyurethane foam-particles composition 520 may be removed using a chemical capable of degrading polyurethane foam (referred to herein as a "dissolver"). For example, in some embodiments the portion of the polyurethane foam-particles composition 520 may be removed using hydrochloric acid. In other embodiments, the portion of the polyurethane foam-particles composition 520 may be removed using other suitable acids or solvents, such as sulfuric acid, organic based solvents, chelating agents, or oxidizing agent. In some embodiments, after formation of the annular plugs 524, an inflatable straddle packer may be installed in the wellbore 502 at the appropriate depths to isolate the section of the wellbore having the portion of the polyurethane foam-particles composition to be removed. After installation of the inflatable straddle packer, the chemical used to remove the portion of the polyurethane foam-particles composition may be injected into the annulus section 518. The annular space 522 formed by the removal of the portion of the polyurethane foam-particles composition may provide for the introduction of water shut-off treatments into the water producing zone 510, while the annular plugs 524 prevent introduction of the water shut-off treatments into the first hydrocarbon producing zone 508 and second hydrocarbon producing zone 512.

Figure 6:
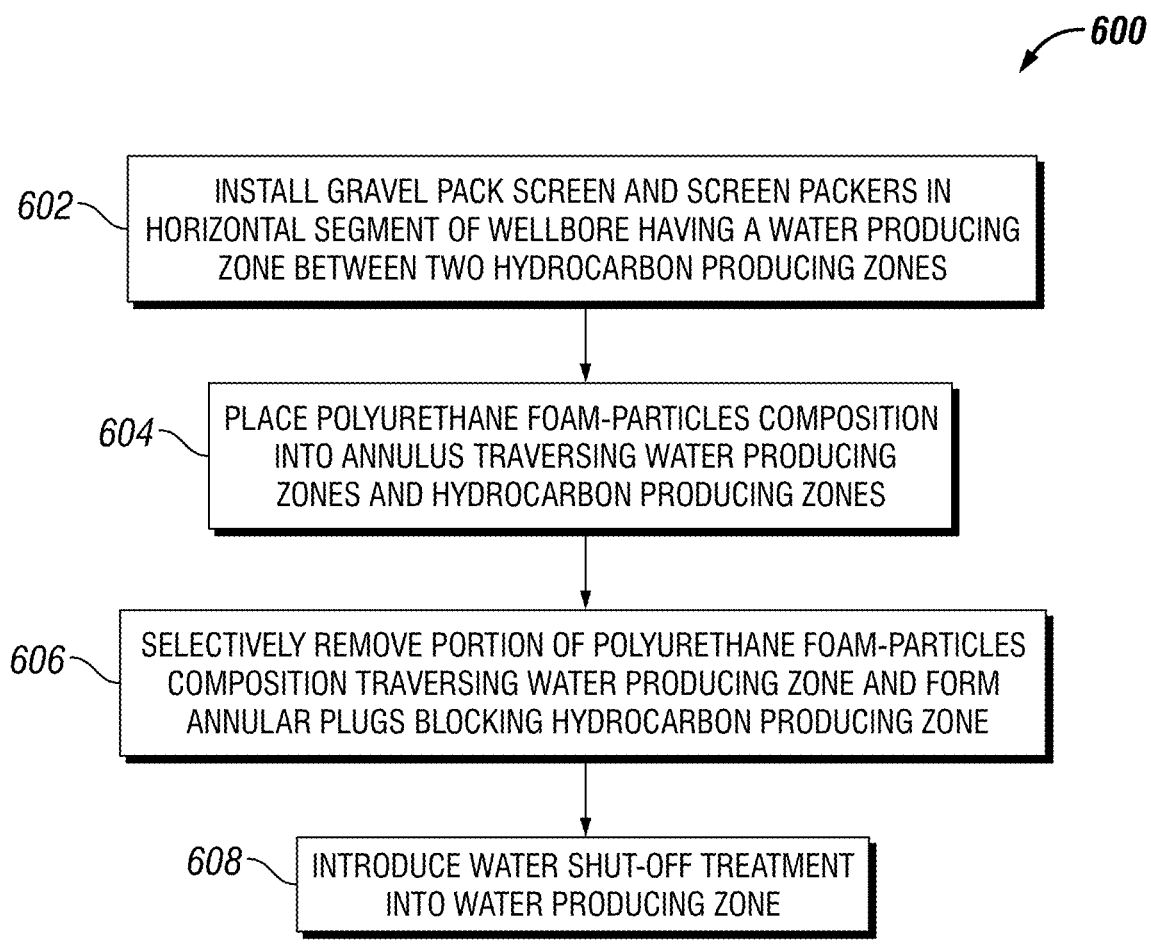
FIG. 6 is a block diagram of a process for installing a polyurethane foam-particles chemical packer as shown in FIGS. 5A-5C in accordance with an embodiment of the disclosure.

FIG. 6 depicts a process 600 for selectively placing a polyurethane foam-particles plug as depicted in FIGS. 5A-5C and in accordance with embodiments of the disclosure. Initially, a gravel pack screen and screen packers may be installed in an openhole horizontal segment of a wellbore having a water producing zone between two hydrocarbon producing zones (block 602). A polyurethane foam-particles composition may be placed in an annulus section that traverses the water producing zone and hydrocarbon producing zones (block 604). For example, in some embodiments, straddle packers may be placed on either side of the hydrocarbon producing zones, and the polyurethane foam-particles composition may be pumped into the annulus section using coil tubing inserted into the wellbore.

Next, a portion of the polyurethane foam-particles composition traversing the water producing zone may be selectively removed such that polyurethane foam-particles plugs blocking the hydrocarbon producing zones are formed (block 606). For example, as discussed supra, the portion of the polyurethane foam-particle composition may be removed using hydrochloric acid or another chemical capable of degrading polyurethane foam (referred to herein as a "dissolver"). In such embodiments, an inflatable straddle packer may be installed in a wellbore at the appropriate depths to isolate the section of the wellbore having the portion of the polyurethane foam-particles composition to be removed. After installation of the inflatable straddle packer, the chemical used to remove the portion of the polyurethane foam-particles composition may be injected into the annulus section.

After removal of the portion of the polyurethane foam-particles composition and formation of the plugs blocking the hydrocarbon producing zones, a water shut-off treatment may be introduced into the water producing zone (block 608). For example, a polymer gel may be introduced into the water producing zone to shut-off water production from the zone. Such water shut-off treatments may include a polymer gel and other components, such as a crosslinking agent and a fluid (such as water) for mixing.

EXAMPLES

The following examples are included to demonstrate embodiments of the disclosure. It should be appreciated by those of skill in the art that the techniques and compositions disclosed in the example which follows represents techniques and compositions discovered to function well in the practice of the disclosure, and thus can be considered to constitute modes for its practice. However, those of skill in the art should, in light of the present disclosure, appreciate that many changes can be made in the specific embodiments which are disclosed and still obtain a like or a similar result without departing from the spirit and scope of the disclosure.

Figure 7:
FIG. 7 is a photograph of a cylindrical plug formed from a polyurethane foam in accordance with an embodiment of the disclosure.
Figure 8:
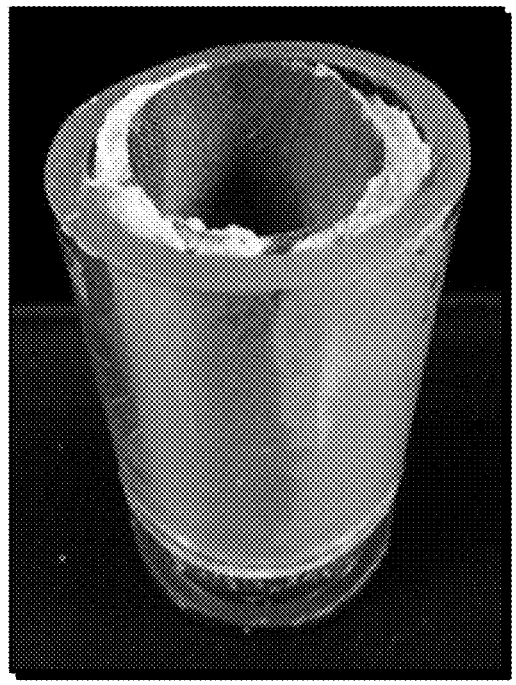
FIG. 8 is a photograph of an annular plug formed from a polyurethane foam in accordance with an embodiment of the disclosure.

Experiments were conducted using a multipurpose polyurethane foam typically used for sealing air-conditioning ducts. Each experiment used a 60 millimeters (ml) plastic syringe having a plastic cylinder with an inner diameter of about 25 mm. In one experiment, the polyurethane foam was placed in the plastic cylinder and a cylindrical plug was formed after curing at room temperature for about 24 hours. FIG. 7 is a photograph 700 of the cylindrical plug formed in the cylinder by curing the polyurethane foam. In another experiment, a polyurethane foam was placed in an annulus defined by the plastic cylinder and a screen to simulate a screen-casing annulus. An annular plug was formed after curing the polyurethane foam at room temperature for about 24 hours. FIG. 8 is a photograph 800 of the annular plug formed in the screen-cylinder annulus by curing the polyurethane foam.

Figure 9:
FIG. 9 is a photograph of a cylindrical plug formed from a polyurethane foam mixed with silica nanoparticles in accordance with an embodiment of the disclosure.

Additional experiments were conducted using the polyurethane foam mixed with colloidal silica nanoparticles and the polyurethane foam filled with mixed with micron-sized sand particles. The colloidal silica nanoparticles were obtained from AkzoNobel of Amsterdam, the Netherlands. The micron-sized particles were sand particles obtained from desert sand having a diameter of about 500 microns. In one experiment, 10 grams (g) of silica nanoparticles were mixed with 60 ml of the polyurethane foam. The polyurethane foam mixed with the silica nanoparticles was placed in the plastic syringe, and the mixture was further compacted to decrease porosity by pushing the piston of the syringe halfway. A cylindrical plug having a diameter of about 25 mm and a length of about 50 mm was formed after curing at room temperature for about 24 hours. FIG. 9 is a photograph 900 of the cylindrical plug formed by curing the polyurethane foam mixed with silica nanoparticles. As shown in FIG. 9, the plug formed from the polyurethane foam mixed with silica nanoparticles has a reduced porosity as compared to the plug formed from the polyurethane foam shown in FIG. 7.

Figure 10:
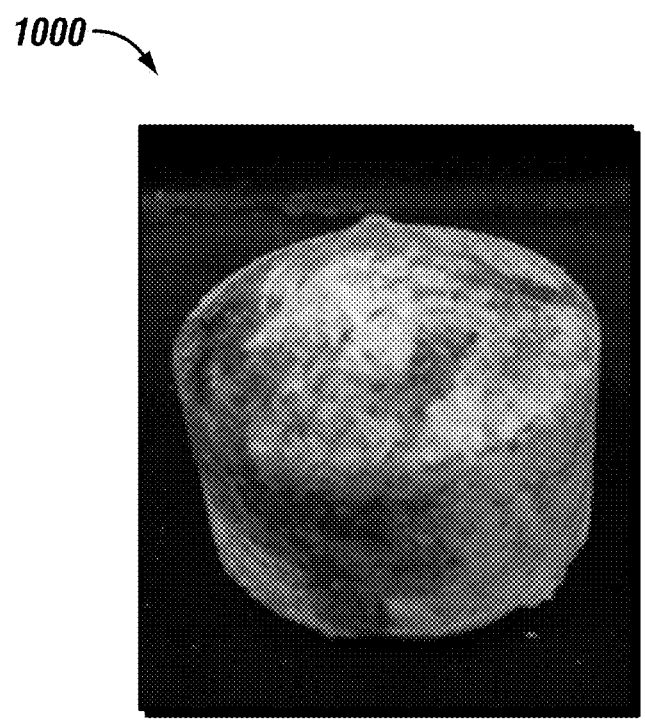
FIG. 10 is photograph of a cylindrical plug formed from a polyurethane foam mixed with micro-sized sand particles in accordance with an embodiment of the disclosure.

In another experiment, 10 g of sand particles were mixed with 60 ml of the polyurethane foam. The polyurethane foam mixed with sand particles having a diameter of about 500 microns was placed in the plastic syringe, and the mixture was further compacted to decrease porosity by pushing the piston of the syringe. A cylindrical plug having a diameter of about 25 mm and a length of about 20 mm was formed after curing at room temperature for about 24 hours. FIG. 10 is a photograph 1000 of the cylindrical plug formed by curing the polyurethane foam mixed with silica nanoparticles. As shown in FIG. 10, the plug formed from the polyurethane foam mixed with 500-micron sized nanoparticles has a reduced porosity as compared to the plug formed from the polyurethane foam shown in FIG. 7.

Ranges may be expressed in the disclosure as from about one particular value, to about another particular value, or both. When such a range is expressed, it is to be understood that another embodiment is from the one particular value, to the other particular value, or both, along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used described in the disclosure are for organizational purposes only and are not meant to be used to limit the scope of the description.

What is claimed is:

1. A method for producing hydrocarbons in a subterranean well, the method comprising:
    installing a screen in a horizontal wellbore, the screen defining an annulus between an inner surface of the wellbore and the screen, the annulus having a section that traverses a fluid producing zone in a formation;
    installing a first screen packer and a second screen packer to isolate the annulus section that traverses the fluid producing zone in the formation; and
    placing a chemical packer composition in the annulus section isolated by the first screen packer and the second screen packer and that traverses the fluid producing zone, the chemical packer composition comprising:
    a polyurethane foam; and
    a plurality of particles, wherein the plurality of particles comprise a plurality of sand particles, each of the plurality of sand particles having a diameter in the range of 1 micron ($\mu$m) to about 1000 microns;
    wherein the chemical packer composition forms a plug in the annulus section to block fluid flow between the first fluid producing zone and the wellbore.

2. The method of claim 1, wherein the fluid producing zone comprises a water producing zone.

3. The method of claim 1, wherein the fluid producing zone comprises a hydrocarbon producing zone.

4. The method of claim 1, comprising removing the plug by introducing a dissolver into the wellbore to contact the plug.

5. The method of claim 4, wherein the dissolver comprises an acid, an organic solvent, a chelating agent, or an oxidizing agent.

6. The method of claim 1, wherein placing the chemical packer composition in the annulus section between the inner surface of the wellbore and the screen that traverses the fluid producing zone comprises:
    inserting an inflatable straddle packer into the wellbore at a well depth sufficient to isolate a section of the wellbore traversing the fluid producing zone;
    inserting coiled tubing into the wellbore; and
    pumping the chemical packer composition into the annulus section via the coiled tubing.

7. The method of claim 1, wherein the screen comprises a gravel pack screen.

8. The method of claim 1, comprising blending the polyurethane foam and the plurality of particles at the surface to form the chemical packer composition before placing the chemical packer composition in the annulus section between the inner surface of the wellbore and the screen that traverses the fluid producing zone.

* * * * *